United States Patent Office 3,236,676
Patented Feb. 22, 1966

3,236,676
TREATMENT OF CELLULOSE WITH TETRAKIS (HYDROXYMETHYL) PHOSPHONIUM RESINS
Harold Coates, Wombourn, and Brian Chalkley, Headingley, Leeds, England, assignors to Albright & Wilson Limited, Oldbury, near Birmingham, England
No Drawing. Filed June 11, 1962, Ser. No. 201,275
Claims priority, application Great Britain, June 16, 1961, 21,895/61
9 Claims. (Cl. 117—62.2)

This invention relates to the modification of natural or regenerated cellulose by the incorporation therein of a phosphorus-methylene-amino polymer.

It has already been proposed by the present applicants to impart flame-resistant properties of cellulosic materials by treating them with condensation products of a tetrakis(hydroxymethyl) phosphonium salt, hereinafter called a THP salt, and a nitrogen compound containing at least two hydrogen atoms and/or methylol radicals. In general it has been found necessary in order to produce a satisfactroy product to apply the condensation product in the form of a further-polymerisable pre-condensate which is thereupon submitted to a curing treatment in situ. While ammonia is included in the broad definition of nitrogen compounds which are to be condensed with the THP salt, the only specific proposal to use ammonia in this role is to be found in Examples 21 and 41 of British specification No. 761,985 and it is noteworthy that in this case the cellulosic material is treated not with a pre-condensate of the THP salt and ammonia, but with an emulsion of an insoluble, i.e. already cured, resin.

In order to cure the THP salt/nitrogen containing condensate in situ heat may be used, but a much more satisfactory method is to use ammonia, as has been proposed to U.S. specification No. 2,772,188. The difficulty arising in this method is the tendency of the condensate to migrate to the surface of the cellulosic material on treatment with a solution containing ammonia. This takes place even if, as is recommended, the cellulosic material is dried, e.g., at 85°–95° C. for 10 minutes, before the ammonia treatment. To overcome this tendency it has been proposed in U.S. specification No. 2,983,623 to treat the material first with gaseous, then with aqueous ammonia. This specification further describes the use of a buffer solution to increase the pH of the pre-condensate solution (about 0.8) to 3.5–4 in order to prevent damage to the cellulosic material and it is observed that if an ammonium salt used for this purpose, partial cross-linking occurs during the drying operation, thereby decreasing the tendency of the polymeric material to migrate to the surface during the ammonia treatment.

The applicants have described further expedients for reducing migration and increasing retention of the polymeric material, in U.S. Patent No. 3,096,201, and U.S. application No. 145,751, filed November 17, 1961, and now abandoned. In the first of these, diammonium sulphite is added to the aqueous solution of the pre-condensate, while in the second an alkali metal hydroxide is added thereto to increase the pH to a value of about 2.5–4.5.

All these prior proposals relate to condensates of THP salts with nitrogen-containing compounds and while in some cases the latter are sufficiently broadly defined to include ammonia, it has not in fact been possible hitherto to fix a THP salt-ammonia pre-condensate on a cellulosic material. There has, moreover, been no proposal to treat cellulosic material with a THP salt itself and it would not have been regarded as possible to fix such a salt on the material so as to render it capable of treatment with ammonia without undue migration to the surface of or loss from the material.

We have now found that it is possible, by adjustment of the pH value and a heat treatment, to fix the THP salt alone, i.e., unreacted with a nitrogen compound, on or in cellulosic materials, and to produce a satisfactory cured polymer on or in the material by treating such THP salt in situ with ammonia. It will be understood that the term "fix" is here used to indicate that the THP salt has been modified by the treatment so that it no longer has the undesired property of migration to the surface of the material when subsequently treated with ammonia, particularly when water is also present. The degree of fixation of the THP salt is much less than that obtained by the subsequent ammonia cure.

Thus, according to our invention, a material consisting of or comprising cellulosic material is treated with an aqueous solution of a THP salt the pH of which has been adjusted to a value between 3 and 9.5, the material so treated is dried and heated to a temperature and for a time sufficient to fix the THP salt on or in the material, and the material is thereupon treated with ammonia to produce a substantially insoluble polymer.

The invention may be used for rendering flame-proof fibrous cellulosic materials, for example, fibres, yarns, fabrics, films, pulp, paper, fibreboard and wood. It is of especial advantage in the treatment of viscose materials.

The procedure in accordance with the invention comprises the following steps:

(1) Adjusting the pH of a solution of a THP salt so that it is in the range 3 to 9.5, preferably 5.5–7.0. This may be done by mixing with the THP salt solution a base or combination of a base with an acid weaker than the base, such that the desired pH range is achieved.

(2) Impregnating the cellulosic material with the solution so obtained.

(3) Heating the material to a temperature between 100° C. and 180° C. for a time which is longer the lower the temperature. If the temperature of heating is 100° C. the duration of heating should be about 30 minutes, while if the temperature is 180° C. the time should be 1–2 minutes. At intermediate temperatures the time should have an appropriate intermediate value.

(4) Treating the heat-treated material with ammonia, which may be applied either as gas, or an aqueous solution of ammonia, or an aqueous solution of an ammonium salt of a weak acid in which the salt is partially hydrolysed, or as any combination of these. It is believed that during step (3) two reactions take place, viz.:

(i) A condensation reaction of the THP molecule, activated by the pH conditions described, and
(ii) A reaction with cellulose molecule by reaction of a hydroxymethyl group of the THP salt with a hydroxyl group on the cellulose molecule, and that these effects combine to give a chemical system which does not migrate to the surface of the cellulosic material during the subsequent reaction with ammonia.

As stated above the pH of the initial solution of THP salt and alkali metal hydroxide is preferably about 5.5 to 7. Other pH values within the range 3 to 9.5 may be used without disadvantage so far as the treatment of the cellulosic material is concerned, but, in general, the higher the pH of the solution the greater the reactivity of the THP system and therefore the shorter the storage life of the solution.

Within the range stated above of times and temperatures for heating the impregnated material, a convenient procedure is to heat the latter for about 10 minutes in the range 120° C. to 130° C.

Among suitable THP salts for use according to the invention there are the chloride, acetate, sulphate and phosphate.

Suitable bases for raising the pH of the THP salt solution are alkali metal hydroxides or alkali metal salts of acids having dissociation constants not greater than $10^{-6}$, or in the case of di- or polybasic acids such as sulphurous acid, having at least one dissociation constant not greater than $10^{-6}$. A particularly suitable organic base is triethanolamine.

The preferred solvent for the THP salt is water, this being the common solvent for textile operations, but it is also possible to operate in solution in the lower alcohols such as methanol and ethanol or in mixtures of these with water.

The following examples illustrate the invention, the parts being by weight:

Example 1

To a solution of 240 parts of tetrakis hydroxymethyl phosphonium chloride (THPC) in 100 parts water was added a solution of 25 parts NaOH dissolved in 60 parts of water with continuous stirring. A sample of 1009 quality 5 oz. per square yard spun viscose rayon plain weave fabric was impregnated with this solution to a wet pick-up of 100 parts of solution per 100 parts of dry fabric. The impregnated fabric was dried at 120°–130° C. for 10 minutes, exposed to an atmosphere of ammonia gas for 10 minutes and then treated in a solution of 10 parts aqueous ammonia (s.g. 0.880) in 50 parts of cold water for 10 minutes. The fabric was removed from this solution and, without rinsing, was washed in a solution of 5 parts soap and 2 parts commercial 100 volume hydrogen peroxide in 1000 parts water for 10 minutes at 40°–45° C., then 10 minutes at 90°–95° C., before finally being rinsed in hot water, squeezed to remove excess water and dried at 80°–90° C. The dried fabric which showed an increase in weight of 25% due to the treatment had excellent resistance to burning when tested by the method described in B.S.S. 3,119/59. This flame resistance was not impaired after subjecting the treated fabric to five successive 1 hour boiling washes in a solution containing 2.5 parts soap and 2.5 parts anhydrous sodium carbonate per 1000 parts water. The resultant fabric besides exhibiting excellent flame resistance showed good crease resist properties and was delustered. The overall phosphorus efficiency was 88.6%.

Example 2

To a solution of 120 parts THPC in 100 parts water was added, with continuous stirring a solution of 12.5 parts NaOH dissolved in 100 parts of water. A sample of 1009 quality 5 oz. per square yard plain weave spun viscose fabric was impregnated with this solution in a laboratory padding mangle to a wet pick-up of 108 parts of solution per 100 parts dry fabric. The impregnated fabric was dried at 120°–130° C. for 10 minutes, exposed to an atmosphere of ammonia for 10 minutes and then treated in a solution of 10 parts ammonia liquor (s.g. 0.89) in 50 parts cold water for 10 minutes. The fabric was removed from this solution and, without rinsing, was washed and dried as described in Example 1. The dried fabric which showed an increase in weight of 20.4% due to the treatment had excellent resistance to burning when tested by a vertical strip flame test such as described in B.S.S. 3,119/59. The treated fabric also exhibited crease resist properties. The flame resistant properties were not impaired by five successive boiling washes in a solution containing 2.5 parts of soap and 2.5 parts anhydrous sodium carbonate per 1000 parts of water. The overall phosphorus efficiency was 93.8%. The fabric was also delustered.

Example 3

To a solution of 240 parts THPC in 100 parts water was added, with continuous stirring, a solution of 25 parts of NaOH in 60 parts of water. A sample of viscose fabric was padded with the resulting solution to a wet pick-up of 126%. The impregnated fabric was dried at 160° C. for 10 minutes, and then cooled in a dessicator over phosphorus pentoxide. The dry fabric was divided in half and each half was treated with anhydrous ammonia at atmospheric pressure, one half for 10 minutes, giving a resin add-on of 26.9%, the other half for 20 minutes giving a resin add-on of 26.4%. Both halves were rinsed in 20% hydrogen peroxide and then washed by boiling for 5 hours in a solution containing 2.5 parts soap and 2.5 parts anhydrous sodium carbonate per 1000 parts of water. The percentages of nitrogen in the fabric before and after the wash were as follows:

1st sample: 2.72% before, 2.59% after washing
2nd sample: 2.28% before, 2.23% after washing

Example 4

A solution of 150 parts THPC in 100 parts water was treated with a solution of NaOH (15.6 parts) in 234 parts water with continuous stirring. A scoured and bleached 6 oz. per square yard cotton drill fabric was impregnated with this solution in a laboratory padding mangle to a wet pick-up of 80 parts solution per 100 parts dry fabric. The impregnated fabric was dried at 120°–130° C. for 10 minutes, exposed to an atmosphere of ammonia gas for 10 minutes and then treated in a solution of 10 parts ammonia liquor (s.g. 0.89) in 50 parts cold water for 10 minutes. The fabric was removed from this solution and, without rinsing, was washed, dried and rinsed as described in Example 1. The dried fabric, which showed an increase in weight of 21.7% due to the treatment had excellent flame resistance when tested by the method described in B.S.S. 3,119/59. This flame resistance was not impaired after subjecting the treated fabric to five successive 1 hour boiling washes in a 0.25% solution of soap and anhydrous sodium carbonate.

Example 5

125 parts of THPC were dissolved in 100 parts of water and to this was added, with continuous stirring, a solution containing 13.0 parts of NaOH dissolved in 262 parts of water. 1009 quality 5 oz. per square yard spun viscose rayon fabric was impregnated with this solution to a wet pick-up of 100 parts of solution per 100 parts of dry fabric. The impregnated fabric was dried at 120°–130° C. for 10 minutes, exposed to an atmosphere of ammonia gas for 10 minutes and then immersed in a solution of 10 parts of ammonia liquor (s.g. 0.89) in 50 parts cold water. The fabric was removed from this solution and, without rinsing, was washed, dried and rinsed as described in Example 1. The dried fabric which showed an increase in weight of 22.5% had excellent resistance to burning when tested by the method described in B.S.S. 3,119/59. This flame resistance was not impaired after subjecting the treated fabric to five successive 1 hour boiling washes in a solution containing 2.5 parts soap and 2.5 parts anhydrous sodium carbonate per 1000 parts of water. Added properties imparted to the treated fabric included resistance to bacterial attack, improved crease resistance, a full handle and a delustered appearance.

Example 6

125 parts of THPC were dissolved in 100 parts of water and to this solution was added 13.0 parts of NaOH dissolved in 262 parts of water with rapid stirring. A scoured and bleached 6 oz. per square yard cotton drill fabric was impregnated with this solution to a wet pick-up of 78.9 parts of solution per 100 parts of dry fabric. The impregnated fabric was dried at 120°–130° C. for 10 minutes and then immersed in a solution containing 10 parts of ammonia liquor in 50 parts of water for 20 minutes. The fabric was removed from this solution and, without rinsing, was washed, dried and rinsed as described in Example 1. The dried fabric which showed an increase in weight of 17.7% due to the treatment had excellent resistance to burning when tested by the method described in B.S.S. 3,119/59. This property was not impaired after subjecting the treated fabric to five successive 1 hour boiling washes in a solution containing 2.5 parts anhydrous sodium carbonate and 2.5 parts soap per 1000 parts of water.

*Example 7*

150 parts of THPC were dissolved in 100 parts of water and to this solution was added, with continuous stirring, 15.6 parts of NaOH dissolved in 234.4 parts of water. A sample of 1009 quality 5 oz. per square yard spun viscose rayon fabric was impregnated with this solution in a laboratory padding mangle to a wet pick-up of 96 parts of solution per 100 parts of dry fabric. The impregnated fabric was dried at 120°–130° C. for 10 minutes, exposed to an atmosphere of ammonia gas for 10 minutes and then treated with a solution containing 10 parts of ammonium carbonate in 90 parts of cold water for 15 minutes. The fabric was removed from this solution and, without rinsing, washed, dried and rinsed as described in Example 1 of U.S. specification 2,983,623. The dried fabric which showed an increase in weight of 25.0% compared to the original fabric had excellent resistance to burning when tested by the method described in B.S.S. 3,119/59. This flame resistance was not impaired after subjecting the treated fabric to five successive 1 hour boiling washes in a solution containing 2.5 parts of anhydrous sodium carbonate and 2.5 parts soap per 1000 parts of water.

*Example 8*

125 parts of THPC were dissolved in 100 parts of water and to this solution was added, with continuous stirring, 48.4 parts of triethanolamine dissolved in 262 parts of water. A scoured and bleached 6 oz. per square yard cotton drill fabric was impregnated with this solution to a wet pick-up of 85 parts of solution per 100 parts of fabric. The impregnated fabric was dried at 120°–130° C. for 10 minutes, exposed to an atmosphere of ammonia gas for 10 minutes and then treated in a solution containing 10 parts of ammonium carbamate in 90 parts of water. The fabric was removed from this solution and, without rinsing, washed, dried and rinsed as described in Example 1. The dried fabric which showed an increase in weight of 20.2% due to the treatment had excellent resistance to burning when tested by the method described in B.S.S. 3,119/59. This flame resistant property was not impaired after subjecting the treated fabric to five successive 1 hour boiling washes in a solution containing 2.5 parts soap and 2.5 parts anhydrous sodium carbonate in 1000 parts of water.

*Example 9*

150 parts of THPC were dissolved in 100 parts of water and to this solution was added, with continuous stirring, 58 parts of triethanolamine dissolved in 234.4 parts of water. A sample of 1009 quality 5 oz. per square yard spun viscose rayon fabric was impregnated with this solution to a wet pick-up of 96 parts of solution per 100 parts of fabric. The impregnated fabric was dried at 120°–130° C. for 10 minutes, exposed to an atmosphere of ammonia gas for 10 minutes and then treated in a solution containing 10 parts of ammonia liquor (s.g. 0.89) in 50 parts of water for 15 minutes. The fabric was removed from this solution and, without rinsing, washed, dried and rinsed as described in Example 1. The dried fabric which showed an increase in weight of 25.0% due to the treatment had excellent flame resistance when tested by the method described in B.S.S. 3,119/59. This property was not impaired after the sample had been subjected to five successive 1 hour boiling washes in a solution containing 2.5 parts anhydrous sodium carbonate and 2.5 parts soap per 1000 parts of water.

*Example 10*

A solution of 150 parts THPC in 100 parts water was treated with continuous stirring with a solution of 32.8 parts anhydrous sodium acetate dissolved in 234.4 parts water. A sample of 1009 quality 5 oz. per square yard spun viscose rayon fabric was impregnated with this solution in a laboratory padding mangle to a wet pick-up of 97 parts of solution per 100 parts fabric. The impregnated fabric was removed from this solution, dried at 120°–130° C. for 10 minutes, exposed to an atmosphere of ammonia gas for 10 minutes and then treated in a solution containing 10 parts aqueous ammonia (s.g. 0.89) per 50 parts water for a further 15 minutes. The fabric was removed from this solution and, without rinsing, was washed, dried and rinsed as described in Example 1. The dried fabric which showed an increase in weight of 26.2% due to treatment had excellent resistance to burning when tested by the method described in B.S.S. 3,119/59. This flame resistance was not impaired after the treated fabric had been subjected to five successive 1 hour boiling washes in a solution containing 2.5 parts soap and 2.5 parts anhydrous sodium carbonate per 1000 parts of water. The treated fabric was delustred, bacterial resistant and showed improved crease resistant properties.

*Example 11*

100 parts of THPC were dissolved in 100 parts of water and to this solution was added, with continuous stirring, 22 parts anhydrous sodium acetate dissolved in 278 parts water. A sample of scoured and bleached 6 oz. per square yard cotton 2 x 2 drill fabric was impregnated with this solution to a wet pick-up of 78 parts of solution per 100 parts of dry fabric. The impregnated fabric was then dried at 120°–130° C. for 10 minutes, exposed to an atmosphere of ammonia gas for 10 minutes and then immersed in a solution containing 10 parts of ammonium carbamate in 90 parts of water for 15 minutes. The fabric was then removed from this solution and, without rinsing, was washed, dried and rinsed as described in Example 1. The dried fabric which showed an increase in weight of 18.1% compared to the original fabric had excellent resistance to burning when tested by the method described in B.S.S. 3,119/59. This flame resistance was not impaired after the treated fabric had been subjected to five successive 1 hour boiling washes in a solution containing 2.5 parts soap and 2.5 parts anhydrous sodium carbonate in 1000 parts of water; the fabric to liquor ratio being 1:40.

*Example 12*

A THPC solution was prepared exactly as described in Example 4. Absorbent cotton wool was impregnated with this solution and squeezed to retain 100 parts of solution per 100 parts of dry cotton wool. The impregnated cotton wool was dried at 120°–130° C. for 10 minutes, exposed to an atmosphere of ammonia gas for 10 minutes and then treated in a solution of 10 parts of ammonia liquor (s.g. 0.88) in 50 parts of water for 10 minutes. The cotton wool was removed from this solution and, without rinsing, immersed in a solution of 5 parts soap and 2 parts of commercial 100 volume hydrogen peroxide in 1000 parts of water for 10 minutes at 45°–50° C. before being rinsed in hot water, squeezed to remove excess water and finally dried at 90° C. The dried material which showed an increase in weight of 19.6% compared to the original cotton wool had good resistance to burning when a lighted match was applied thereto.

*Example 13*

A sample of cotton wool treated as in Example 12 and a similar sample of untreated cotton wool were immersed in a solution of 5 parts Kiton Fast Red G (Ciba Ltd.) and 5 parts anhydrous sodium sulphate in 1000 parts of water at 90°–95° C. for 1 hour with a liquor to cotton ratio of 40:1. After removing the two samples and rinsing in cold water for 20 minutes, the treated sample was dyed to a much greater depth of shade than the untreated sample. Further, the dyeing on the treated cotton wool was more resistant to hot soaping than the dyeing on the untreated sample.

*Example 14*

A THPC solution was prepared exactly as described in Example 8. A sample of Whatman's No. 20 filter paper was impregnated with this solution and squeezed to retain 150 parts of solution per 100 parts of dry paper. The paper was dried at 120°–130° C. for 10 minutes, exposed to ammonia gas for 10 minutes and then immersed in a solution containing 10 parts of ammonia liquor (s.g. 0.89) per 50 parts water for 10 minutes. The paper was removed from this solution and immediately immersed in a solution containing 6 parts commercial 100 volume hydrogen peroxide in 1400 parts of cold water for 20 minutes. The paper was removed from this solution, rinsed in warm water and then dried at 85°–90° C. The paper, which showed an increase in weight of 28–30% compared to the original sample had excellent resistance to burning.

*Example 15*

A THPC solution was prepared exactly as described in Example 4. A sample of wood was deaerated under vacuo and then immersed in this solution until completely wetted out. The sample was allowed to drain for 1 hour and was then dried at 120°–130° C. for 10 minutes. The sample was again placed under vacuum and then gaseous ammonia allowed into the vessel. After being exposed to this atmosphere for 10 minutes, the sample was removed and immersed in a solution containing 10 parts of ammonia liquor (s.g. 0.88) in 50 parts of water for 10 minutes. The sample was removed from this solution and immediately immersed in a solution containing 2 parts of commercial 100 volume hydrogen peroxide in 1000 parts of water for 20 minutes. The sample was then rinsed, first in hot and then in cold water followed by drying at 90° C. The treated sample which showed an increase in weight of 31.2% compared to the original sample had excellent resistance to burning when exposed to the flame of a Bunsen burner.

*Example 16*

To a solution of 150 parts THP acetate in 240 parts water was added a solution of 10 parts NaOH dissolved in 100 parts water. A sample of 1009 quality 5 oz. per square yard spun viscose rayon plain weave fabric was impregnated with this solution to a wet pick-up of 100 parts of solution per 100 parts of dry fabric. The impregnated fabric was then further processed as described in Example 1. The resultant fabric showed excellent flame resistance both before and after washing, showed good crease resist properties and was delustred. The overall phosphorus efficiency was 85%.

What we claim is:

1. A method of producing flame-resistant cellulosic materials comprising treating cellulosic material selected from the group consisting of natural cellulose and regenerated cellulose with a composition consisting essentially of an aqueous solution of a tetrakis (hydroxymethyl) phosphonium salt having a pH between about 3 and 9.5, drying said treated material and heating said treated material to a temperature sufficient to fix said salt on said material, and then treating said material with ammonia to produce a substantially insoluble polymer formed from said salt and ammonia on said cellulosic material.

2. The method of claim 1 wherein the pH of said aqueous solution is between 5.5 and 7.

3. The method of claim 1 wherein said treated cellulosic material is heated to a temperature between about 100° C. and 180° C. for a period of from 1 to 30 minutes; said heating period being about 30 minutes at 100° C., and shorter time periods for higher temperatures with between 1 and 2 minutes at 180° C.

4. The method of claim 2 wherein said treated cellulosic material is heated to a temperature between about 100° C. and 180° C. for a period of from 1 to 30 minutes; said heating period being about 30 minutes at 100° C., and shorter time periods for higher temperatures with between 1 and 2 minutes at 180° C.

5. The process of claim 1 wherein said material is treated with ammonia by first exposing the material to the action of gaseous ammonia and then contacting said material with aqueous ammonia.

6. The method of claim 3 wherein said material is heated for about 10 minutes at between 120° C. and 130° C.

7. The method of claim 3 wherein said salt is the chloride.

8. The method of claim 4 wherein said material is treated with ammonia by first exposing the material to the action of gaseous ammonia and then contacting said material with aqueous ammonia.

9. The method of claim 8 wherein said salt is the chloride.

References Cited by the Examiner

UNITED STATES PATENTS

| | | | |
|---|---|---|---|
| 2,668,096 | 2/1954 | Reeves et al. | 117—136 XR |
| 2,772,188 | 11/1956 | Reeves et al. | 117—136 |
| 2,983,623 | 5/1961 | Coates | 117—62.2 |
| 3,084,072 | 4/1963 | Deeley | 117—137 XR |

WILLIAM D. MARTIN, *Primary Examiner.*